F. L. RAPSON.
LIFTING JACK AND THE LIKE FOR USE ON MOTOR ROAD AND OTHER VEHICLES.
APPLICATION FILED JUNE 30, 1917.

1,322,948.

Patented Nov. 25, 1919.
4 SHEETS—SHEET 1.

INVENTOR
F. L. RAPSON

F. L. RAPSON.
LIFTING JACK AND THE LIKE FOR USE ON MOTOR ROAD AND OTHER VEHICLES.
APPLICATION FILED JUNE 30, 1917.

1,322,948.

Patented Nov. 25, 1919.
4 SHEETS—SHEET 3.

INVENTOR
F. L. RAPSON

F. L. RAPSON.
LIFTING JACK AND THE LIKE FOR USE ON MOTOR ROAD AND OTHER VEHICLES.
APPLICATION FILED JUNE 30, 1917.

1,322,948.

Patented Nov. 25, 1919.
4 SHEETS—SHEET 4.

INVENTOR
FREDERICK L. RAPSON

UNITED STATES PATENT OFFICE.

FREDERICK LIONEL RAPSON, OF LIVERPOOL, ENGLAND.

LIFTING-JACK AND THE LIKE FOR USE ON MOTOR ROAD AND OTHER VEHICLES.

1,322,948.         Specification of Letters Patent.     Patented Nov. 25, 1919.

Application filed June 30, 1917. Serial No. 178,035.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks and the like for Use on Motor Road and other Vehicles, of which the following is a specification.

This invention relates to improvements in lifting jacks and the like for use on motor road and other vehicles.

The invention has for its object to provide on a motor road vehicle such as a motor car, means for lifting the car from the ground which means are adapted to be actuated by the engine of the car or by other means so that the weight of the car can be taken off the wheels to relieve the tires when in the garage, or to jack the car up when it is desired to repair punctures or effect other repairs, or to raise the car for washing or inspection purposes.

A further object is to provide under the chassis of the vehicle one or more jacks which will automatically raise or lower the car to any predetermined height in considerably less time than it would take to get the ordinary hand jack from the car.

A still further object is to so construct the lifting means that the weight of the car will be distributed over a large area and be stronger and quicker in action than the ordinary jacks; higher when in raised position and occupy a small space when in its inoperative position.

With these and other objects in view the invention consists in providing adjacent to the front and rear axis or other convenient part of the chassis, one or more pairs of vertically movable members or jacks driven from the engine or by other suitable means such as a hand wheel, so that the lower ends of the said jacks will engage the ground and raise the vehicle when moved in one direction, or draw the lower ends of the jacks up and out of action when moved in the opposite direction.

The invention also consists in providing means to automatically control the movement of the lifting jacks so that the car can be raised or lowered to any predetermined distance.

I will now describe one form of my invention with reference to the accompanying drawings in which:—

Figure 1:
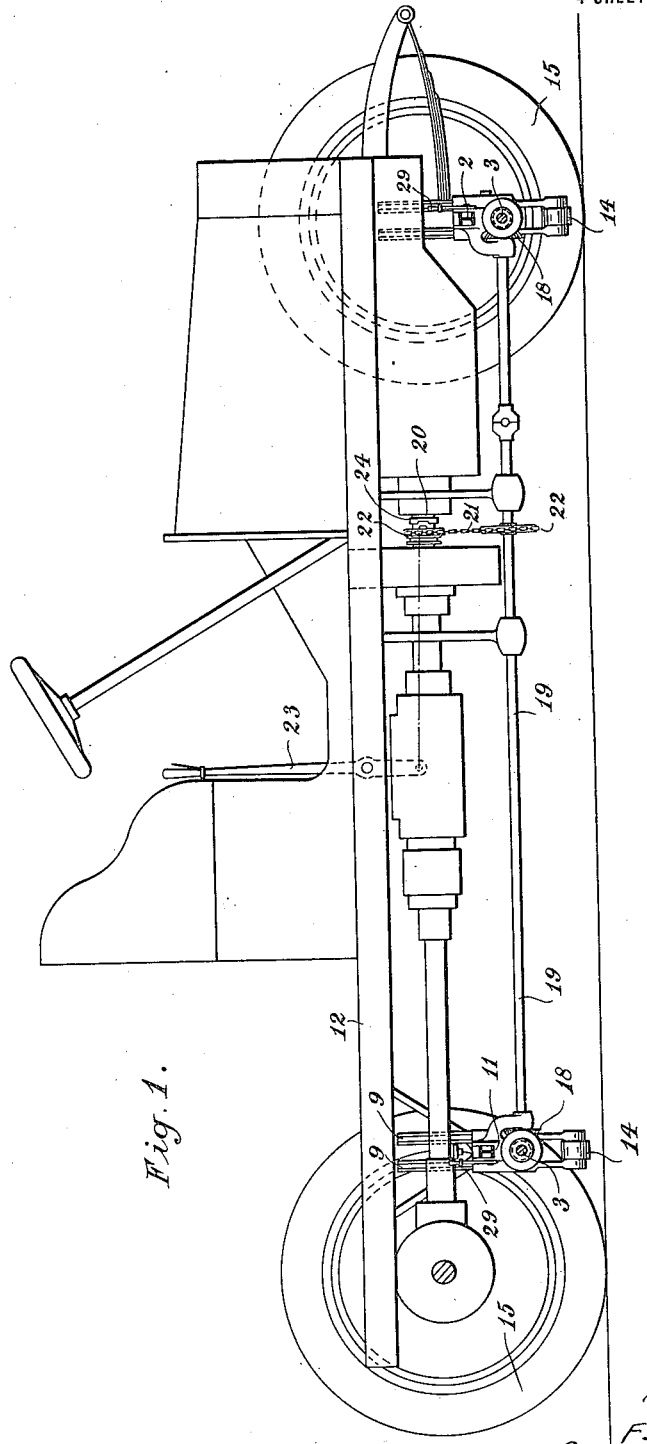
Figure 1 is a sectional side elevation of a car fitted with my improved jack.
Figure 2:
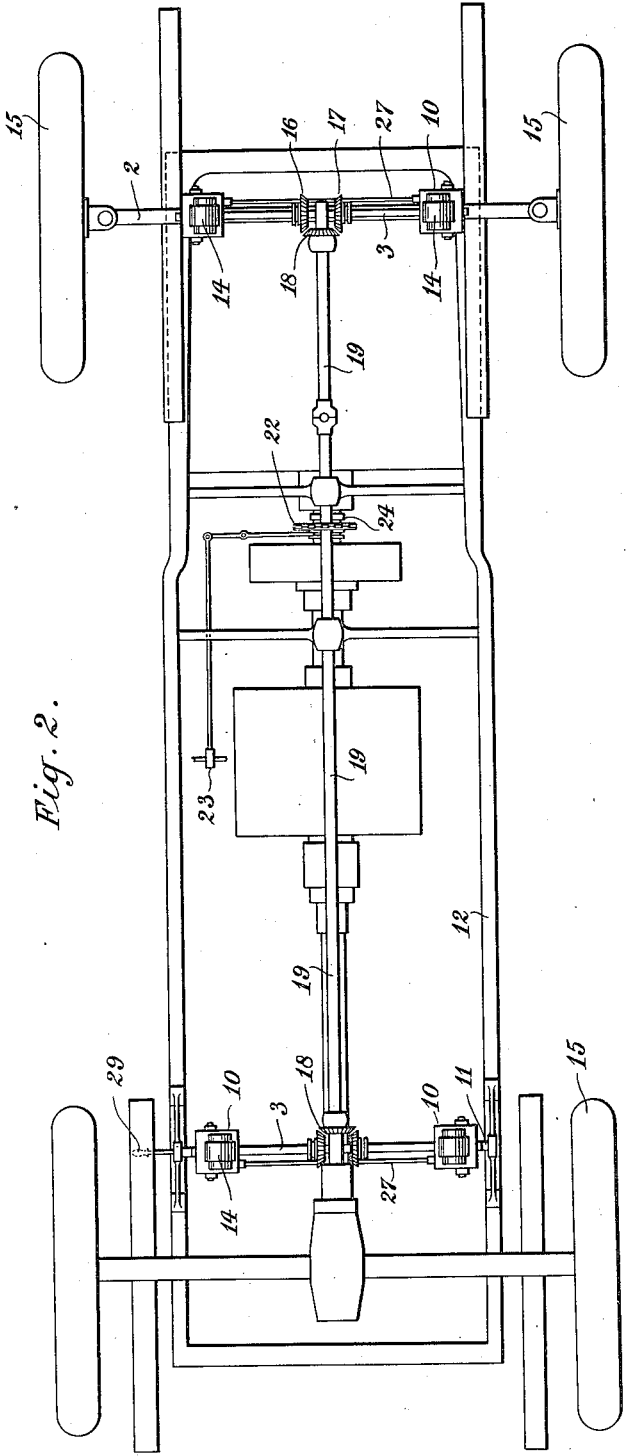
Fig. 2 is an inverted plan thereof.
Figure 3:
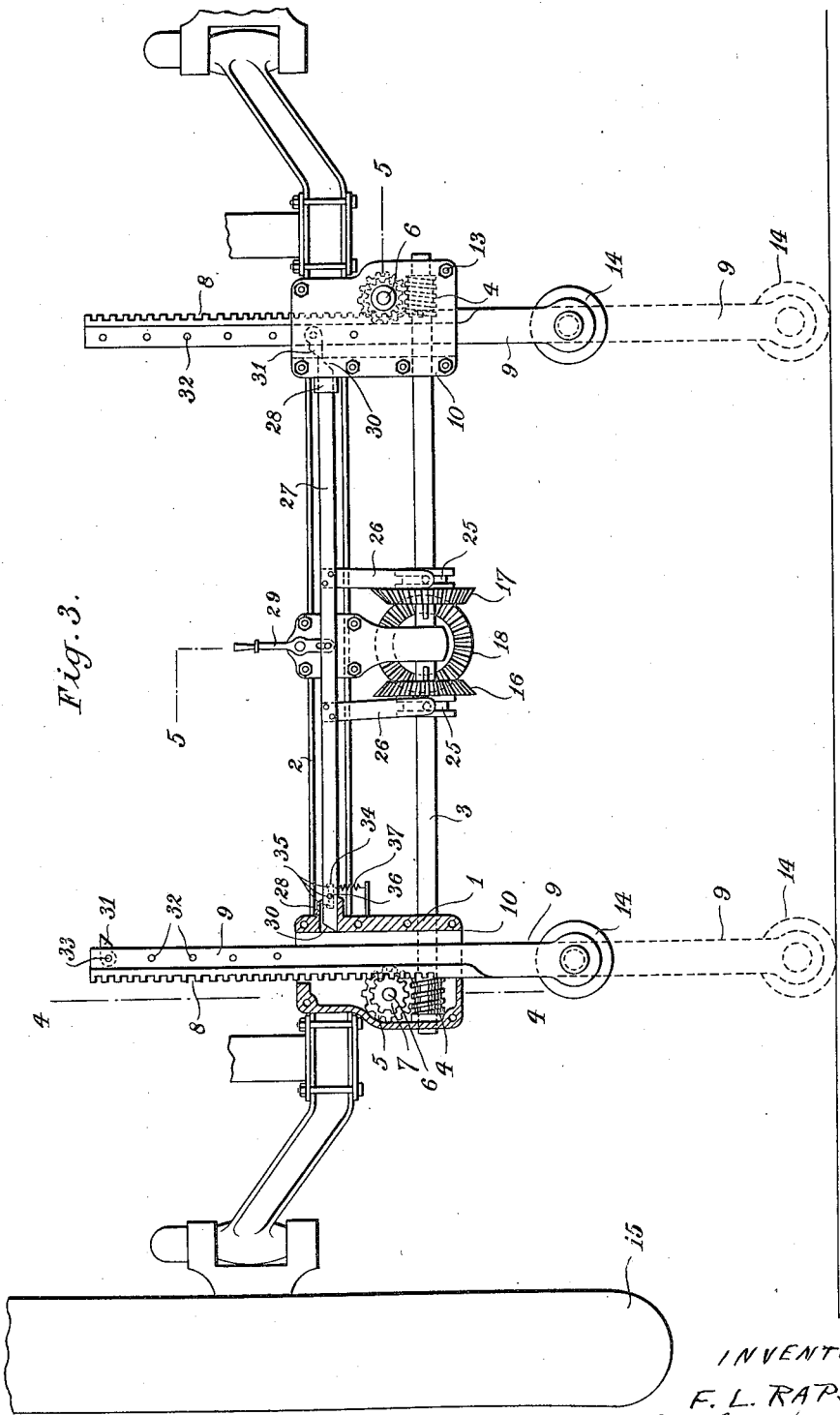
Fig. 3 is an enlarged sectional front elevation.
Figure 4:
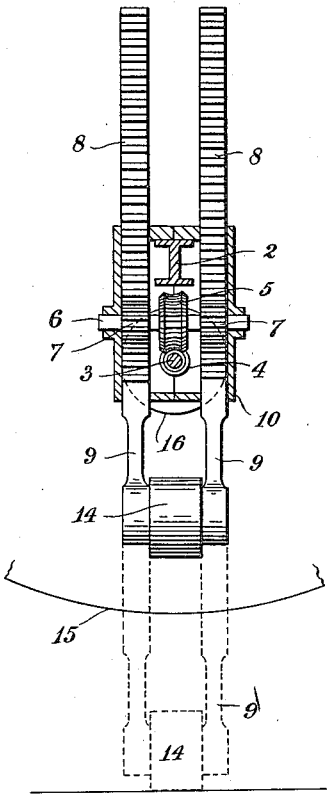
Fig. 4 is a section taken on the line 4—4 on Fig. 3.
Figure 5:
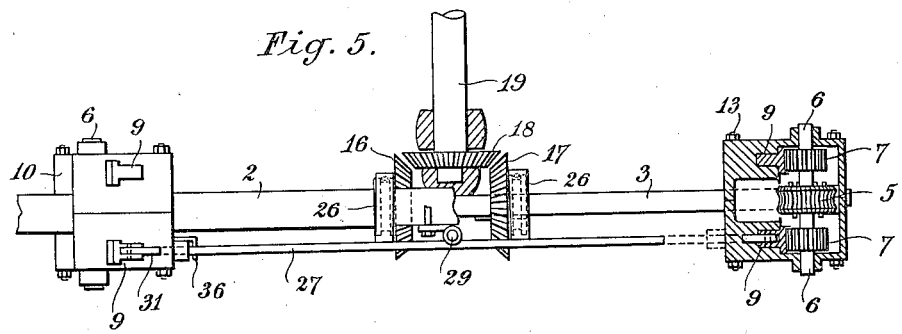
Fig. 5 is a detail plan view, partly in section on the line 5—5 of Fig. 3.

According to one form of my invention I rotatably mount in suitable bearings 1 on or adjacent to each axle 2 a rod 3 which is provided with a worm 4 at each end. These worms 4 are adapted to operate worm wheels 5 mounted on cross shafts 6 carrying toothed pinions 7 which in turn mesh with toothed racks 8 formed on or connected with vertically movable lifting members or jacks 9. These members or jacks 9 are preferably guided in casings 10 which may wholly or partially inclose the worm and toothed gearings and may be fixed on the axle 2 in any convenient manner. These casings 10 are preferably divided vertically so that they can be easily secured to the axle 2 or to bars or a bar 11 suitably secured to the axle or to the chassis 12 the latter arrangement being shown for the rear of the car. The halves of the casings 10 are secured together by any suitable means such as by bolts 13. Each lifting member 9 preferably consists of two rack bars 8 arranged one on each side of the axle 2 and moved by two pinions 7 arranged one each side of the wormwheel 5 and worm operating rod 3. To the lower ends of the movable members 9 is or are connected one or more wheels 14 rollers or skates or other suitable means to engage the ground. It will be seen that the lifting jacks 9 thus constructed are arranged adjacent to each wheel 15 of the vehicle. Upon each rod 3 and preferably intermediately of the worms 4 thereon are slidably mounted two bevel wheels 16 and 17 which are adapted to engage, when in their operative position, a bevel wheel 18 secured on each end of a shaft 19 longitudinally disposed under the chassis 12 of the car so that the front or the rear rod 3 carrying the worms 4 can be connected as desired to this shaft 19 to rotate in either direction. This longitudinal shaft 19 is adapted to be driven from the engine shaft 20 or the "Cardan" shaft by suitable gearing or by other convenient means, preferably by a chain 21 and sprocket wheels 22. Adjacent to the driver's seat is fitted a lever 23 or the like which is connected by any suitable means, such as Bowden wire mechanism to a clutch 24, free wheel mechanism or the like so that upon the operation of this lever the longitudinal shaft 19 can be driven by the engine or other operating means. This clutch 24 or the like may be provided on the engine or the "Cardan" shaft or on the longitudinal shaft as desired.

Any convenient means may be employed to connect the worm carrying rods 3 up with the longitudinal shaft 19 so that they may be driven thereby in either direction, to raise or lower the lifting member or jacks 9 but I preferably employ the bevel wheels 16 and 17 previously mentioned. Each bevel wheel, slidably mounted on the rods 3 but capable of rotating them when placed in gear with the bevel wheels 18 on the longitudinal shaft 19 is formed or provided with a sleeve or collar having a circumferential groove or recess 25.

Within each of these recesses 25 is disposed the forked ends of rods 26 which are rigidly secured to a bar 27 slidably mounted in suitable bearings 28 in front of or above each of the said worm carrying rods 3. Each of these bars 27 is adapted to be moved in one direction or the other by a suitably pivoted hand lever 29 so that one or the other of the bevel wheels 16 or 17 is adapted to be moved into engagement with the bevel wheel 18 on the end of the longitudinal shaft 19 and be driven thereby.

It will thus be seen that one or the other of the bevel wheels 16 or 17 on each of the worm carrying rods 3 can be driven by the bevel wheel 18 on the adjacent end of the longitudinal shaft 19 and that the worm carrying rods 3 will be rotated in one direction or the other according to which bevel wheel is moved to engage the intermediate bevel wheel 18 on the end of the longitudinal shaft 19.

Each slidable bar 27 is also provided or formed at each end with a nose or inclined surface 30 which is adapted to be engaged by one or more strikers 31 secured on the lifting members or jacks 9 so that when one of these strikers 31 engaged the nose or projection 30 on the slidable bar 27 the latter will be moved sidewise and automatically place the engaged bevel wheel 16 or 17 out of engagement with the bevel wheel 18 on the longitudinal shaft 19. Thus the movement of these vertical members or jacks 9 can be automatically regulated. If desired, the striker or strikers 31 on one or both of the jacks 9 could be made adjustable in any convenient manner so that the jacks 9 could be lowered or raised to a predetermined degree. One convenient method of making the or each striker 31 adjustable is to slidably mount it on the vertical member 9 and provide the said member with a plurality of spaced holes 32 through which a pin 33 may be passed to engage and hold the striker 31. The slidable bar 27 is also provided with a slot 34 having three recesses 35 into one of which a stop 36 is adapted to be engaged, a suitable spring 37 being provided to normally hold the stop 36 engaged in one of the recesses 35. Thus when the stop 36 is in the middle recess the slidable bar 27 and the gears 16 and 17 are in their inoperative position and the outer recesses will limit the movement of the bar 27 in either direction.

In operation, and in the event of a puncture the car is first stopped and the lever 23 by the driver's seat is operated to clutch up the longitudinal shaft 19 to the engine so as to be driven thereby. The driver now leaves his seat and operates the lever 29 at the back or at the front of the car to move the sliding bar 27 so as to place one of the slidable bevel wheels 16 or 17 in gear. The operation of, for instance the front hand lever 29 will cause the front worm carrying rod 3 to be rotated in one direction and operate the worm wheels 5 and pinions 7. This action will move the jacks 9 so that the lower ends will contact with the ground and thereby raise the car therefrom. When the desired height is reached, predetermined by the position of the striker 31 on one of the jacks, 9, the striker 31 engages the nose 30 on the adjacent end of the bar 27 and slides the bar 27 sidewise to withdraw the engaged bevel wheel out of mesh with the bevel wheel on the longitudinal shaft 19 and so stop the movement of the jacks. The engine can now be stopped if so desired and the puncture attended to. When the tire is repaired the engine is again started and the hand lever 29 on the front of the vehicle is moved in the other direction to move the other bevel wheel in engagement with the bevel wheel on the forward end of the longitudinal shaft 19. Thus the worm carrying rod 3 will be rotated in the opposite direction and move the jacks 9 back to their normal or raised position the driving mechanism being automatically thrown out of engagement by a suitably placed striker 31 on the other jack 9. It will be seen that the rear of the car can be raised in a similar manner independently of the front of the car or that both the front and rear wheels 15 can be lifted clear of the ground to any predetermined height.

If desired, the worm carrying rods 3 could be operated by one or more hand wheels or the like instead of by the engine. Suitable covers, of leather or other suitable material may be provided to protect the working parts and prevent them being splashed by mud.

Thus it will be seen that by the above described means the front, rear, or the whole of the car can be mechanically raised clear of the ground without any strain on the chassis which is caused when hand jacks are used to tilt the car and raise one wheel only. Also the car when raised can be easily moved sidewise on the wheels at the ends of the jacks.

It will also be seen that the controlling mechanism of my improved jack is rendered fool-proof; for instance, should the control lever 23 for operating the longitudinal shaft 19 be moved in mistake while the car is running the mechanism for operating the jack or jacks 9 is out of gear until the driver leaves his seat and actuates the lever 29 at the front or at the rear of the car.

What I claim is:—

1. In a vehicle, oppositely disposed vertically movable jacks, a transverse rod geared to said jacks, a longitudinal shaft adapted to have power applied thereto, a gear wheel fixed on the longitudinal shaft, companion gear wheels, one at each side of the gear wheel of the longitudinal shaft, splined on the transverse rod, a slidable bar having connection with said companion gear wheels and having its ends beveled, and trips adjustably mounted on the jacks and having beveled faces adapted to engage the beveled ends of the bar to move the latter to and thereby automatically throw said companion gears to a neutral position with relation to the gear wheel of said longitudinal shaft.

2. In a vehicle, a movable jack supported under the body of the vehicle, a rod supported under the body of the vehicle and geared to said jack, a shaft adapted to have power applied thereto, a gear mechanism connecting said rod and said shaft, a slidable bar located under the body of the car and having connection with said gear mechanism and having one end beveled and projecting into the path of movement of the jack, and a trip adjustably carried by the jack for engagement with said beveled end of said bar to slide the latter and thereby automatically throw said gear mechanism out of operation.

3. In a vehicle, oppositely disposed vertically movable jacks, a transverse rod geared to said jacks, a longitudinal shaft adapted to have power applied thereto, a gear wheel fixed on the longitudinal shaft, companion gear wheels, one at each side of the gear wheel of the longitudinal shaft, splined on the transverse rod, means for moving the gear wheels on the transverse rod to throw either into positive engagement with the gear wheel on the longitudinal shaft, a trip on one of the jacks to throw the gearing out of action in one direction, and a trip on the remaining jack to throw the gearing out of action in the opposite direction.

4. In a vehicle, oppositely disposed vertically movable jacks, a transverse rod geared to said jacks, a longitudinal shaft adapted to have power applied thereto, a gear wheel fixed on the longitudinal shaft, companion gear wheels, one at each side of the gear wheel of the longitudinal shaft, splined on the transverse rod, means for moving the gear wheels on the transverse rod to throw either into positive engagement with the gear wheel on the longitudinal shaft, and trips adjustable on the jacks for throwing the operating mechanism out of action when the jacks have reached the predetermined position in each direction.

5. In a vehicle, oppositely disposed vertically movable jacks, a transverse rod geared to said jacks, a longitudinal shaft adapted to have power applied thereto, a gear wheel fixed on the longitudinal shaft, companion gear wheels, one at each side of the gear wheel of the longitudinal shaft, splined on the transverse rod, a transversely slidable bar having connection with the said companion gear wheels, manually operable means for moving the slidable bar in either direction, and trips mounted upon the jacks to move the slidable bar to neutral position.

6. In a vehicle, oppositely disposed vertically movable jacks, a transverse rod geared to said jacks, a longitudinal shaft adapted to have power applied thereto, a gear wheel fixed on the longitudinal shaft, companion gear wheels, one at each side of the gear wheel of the longitudinal shaft, splined on the transverse rod, a transversely slidable bar having connection with the said companion gear wheels and provided with a longitudinal slot and a middle and end recesses opening into the longitudinal slot, a stop extending into the slot and adapted to engage any one of the said recesses, means for yieldably holding the stop in the required recess, and operating means for the slidable bar.

In testimony whereof I have hereunto signed my name.

FRED. LIONEL RAPSON.